United States Patent
Scott et al.

(10) Patent No.: US 9,015,831 B2
(45) Date of Patent: Apr. 21, 2015

(54) METHOD AND APPARATUS FOR STATIC TAINT ANALYSIS OF COMPUTER PROGRAM CODE

(75) Inventors: Roger H. Scott, Lafayette, IN (US); Andy C. Chou, San Francisco, CA (US)

(73) Assignee: Synopsys, Inc, Mountain View, CA (US)

( * ) Notice: Subject to any disclaimer, the term of this patent is extended or adjusted under 35 U.S.C. 154(b) by 196 days.

(21) Appl. No.: 13/570,024

(22) Filed: Aug. 8, 2012

(65) Prior Publication Data

US 2014/0047538 A1    Feb. 13, 2014

(51) Int. Cl.
*G06F 11/00* (2006.01)
*G06F 11/36* (2006.01)
*H04L 29/06* (2006.01)
*G06F 21/56* (2013.01)

(52) U.S. Cl.
CPC ........ *G06F 11/3604* (2013.01); *G06F 11/3612* (2013.01); *H04L 63/1433* (2013.01); *G06F 11/3652* (2013.01); *G06F 21/564* (2013.01); *G06F 21/562* (2013.01)

(58) Field of Classification Search
None
See application file for complete search history.

(56) References Cited

U.S. PATENT DOCUMENTS 5,522,036 A * 5/1996 Shapiro ...................... 714/38.12
5,590,329 A   12/1996 Goodnow, II et al.
2009/0125976 A1 * 5/2009 Wassermann et al. ............ 726/1
2010/0058475 A1   3/2010 Thummalapenta et al.
2012/0185943 A1   7/2012 Tripp
2012/0266247 A1 * 10/2012 Guy et al. ...................... 726/25

FOREIGN PATENT DOCUMENTS

JP    2004171064 A    6/2004
JP    2011257872 A    12/2011
JP    2014056567 A    3/2014
WO    WO-2004095176 A2    11/2004

OTHER PUBLICATIONS

Bloch, Joshua, "Trail: Collections", https://web.archive.org/web/20000823103533/http://www.java.sun.com/docs/books/tutorial/collections/, 1 pg.
"European Application Serial No. 13179799.5, European Search Report mailed Jan. 8, 2014", 8 pgs.
(Continued)

*Primary Examiner* — Fatoumata Traore
(74) *Attorney, Agent, or Firm* — Schwegman Lundberg & Woessner, P.A.

(57) ABSTRACT

A method is provided to infer taintedness in code expressions encoded in a computer readable device comprising: configuring a computer system to, store a representation of a computer program that is to be evaluated in non-transitory storage media; identify within the representation a pointer cast operation; determine whether an identified cast operation involves a cast from a pointer to a raw memory data type to a pointer to a structured data type; determine whether a structured data type casted to is associated with indicia of externalness; designating data addressed by that pointer as tainted; and determine whether data designated as tainted is consumed by an operation in the computer program that acts as a taintedness sink.

23 Claims, 10 Drawing Sheets

(56) References Cited

OTHER PUBLICATIONS

"ISO/IEC JTC 1/SC 22/WG 14 N 1624 Information Technology—Programing languages, their environments and system software interfaces—C Secure Coding Rules", [online]. (c) ISO/IEC 2012. [retrieved on Dec. 18, 2013]. Retrieved from the Internet: <URL: http://www.open-std.org/jtcl/sc22/wg14/www/docs/n1624.pdf>, (Jun. 26, 2012), 1-88.

Becker, Dan, "Get started with the Java Collections Framework", http://www.javaworld.com/article/2076800/java-se/get-started-with-the-java-collectionsframework.html, (Nov. 1, 1998), 1-15.

Slowinska, Asia, et al., "Pointer Tainting Still Pointless (but we all see the point of tainting)", ACM SIGOPS Operating Systems Review, 44(3), (2010), 88-92.

Slowinska, Asia, et al., "Pointless Tainting? Evaluating the Practicality of Pointer Tainting", Proceedings of the Fourth ACM European Conference on Computer Systems, EuroSys '09, (2009), 14 pgs.

"Japanese Application Serial No. 2013-164730, Office Action mailed Jul. 22, 2014", (w/ English Translation), 8 pgs.

Kuramitsu, Kimio, "Konoha Monogatari", vol. 243 Japan: Gijutsu-Hyohron Co., Ltd, (Jan. 18, 2011), 148-152.

Nishita, Seikoh, "Detecting Web Application Vulnerabilities with Static Analysis", in IEICE Technical Report, vol. 106, No. 324, (Oct. 19, 2006), 1-6.

\* cited by examiner

```
struct in_addr {
    union {
        struct {
            u_char s_b1, s_b2, s_b3, s_b4;
        } S_un_b;
        struct {
            u_short s_w1, s_w2;
        } S_un_w;
        u_long S_addr;
    } S_un;
};

struct nread_ip {
    u_int8_t         ip_vhl;              /* header length, version       */
    u_int8_t         ip_tos;              /* type of service              */
    u_int16_t        ip_len;              /* total length                 */
    u_int16_t        ip_id;               /* identification               */
    u_int16_t        ip_off;              /* fragment offset field        */
    u_int8_t         ip_ttl;              /* time to live                 */
    u_int8_t         ip_p;                /* protocol                     */
    u_int16_t        ip_sum;              /* checksum                     */
    struct in_addr ip_src, ip_dst;        /* source and dest address      */
};

struct nread_tcp {
    u_short th_sport;    /*  source port        /*
    u_short th_dport;    /*  destination port   */
    u_int32_t th_seq;    /*  sequence number    */
    u_int32_t th_ack;    /*  acknowledgement number   */
    u_int  th_x2:4,      /*  (unused)           */
        th_off:4;        /*  data offset        */
    u_char th_flags;
    u_short th_win;    /*   window      */
    u_short th_sum;    /*   checksum    */
    u_short th_urp;    /*   urgent pointer   */
};
```

FIG. 8

```
void redmond_bug(struct foo *p)
{
```
Downcasting "p->inter->raw" from void * to struct network_packet_header implies that the
data that this pointer points to is tainted.
Assigning: "p_buffer" = "(struct network_packet_header*)p->inter->raw". Both are now tainted.
```
    struct network_packet_header *p_buffer =
        (struct network_packet_header*)p->inter->raw;
    struct oherwise *p_other = (struct othewrwise*)p->raw2;
```

Condition "p_buffer->a == 3", taking true branch
```
    if (p_buffer->a == 3) {
        p_other->b = 0;
```
Jumping to label "label"
```
        goto label;
    }
    if (p_buffer->b >= 1) {
        return;
    }
    p_other->b = p_buffer->b;
```

Reached label "label"
```
    label:
```
Other violation (DOWNCAST_TAINTED_DATA)
Using tainted variable "p_buffer->b" as an index into an array "array".
```
    array[p_buffer->b] = 0;  /* should be "p_other->b" */

}
```

FIG. 9

METHOD AND APPARATUS FOR STATIC TAINT ANALYSIS OF COMPUTER PROGRAM CODE

BACKGROUND

Software code often contains errors. Some of these errors are easily detected by visual inspection of the printed code. More subtle errors are typically only discovered with the help of software debugging analysis tools.

Taint analysis involves detection of usage within source code of untrusted data from outside of the control of a computer program when executing on a computer system. More specifically, taint analysis involves distinguishing between trusted data created within the address space of an executing program and data that was in some manner copied into this address space from an external, potentially untrusted source. Taint analysis typically involves a form of information-flow analysis of computer program code that establishes whether values from untrusted sources may flow into security-sensitive computer system operations. Taint analysis may involve marking untrusted data arriving from taint sources as being tainted. As data propagates through computer memory and through various operations, that taint marking information is propagated with the data itself. Taint analysis may be employed with either dynamic debugging analysis techniques or static debugging analysis techniques or a combination of both.

Dynamic software analysis tools perform run-time error checking. Software errors may be captured as they occur. For example, if control branches down a particular path in the program, an error (e.g., an out-of-bounds memory access) that occurs along that path may be detected. Although dynamic analysis tools often are invaluable in the debugging process, they are not without shortcomings. In particular, it may be difficult to exercise complex software thoroughly during testing. For example, in particularly large programs, it may be possible to rigorously test only a small percentage of all possible program behaviors before the software is released to end users. Rarely used portions of the software (e.g., rarely-traveled paths in conditional branches) may never be tested before the software is deployed in the field.

Static software analysis tools operate on static code (i.e., code that is not running during the analysis process). Static analysis is performed on computer program code to simulate operation of an actual computer system configured using the code without actually using the code to physically configure the computer system. Static analysis provides an understanding of the code that can ensure that the source code complies with prescribed coding standards, to find unwanted dependencies, and to ensure that the desired structural design of the code is maintained, for example. Static analysis also can detect errors that are easily missed when using dynamic analysis tools alone. For example, static analysis may detect an illegal operation that is contained in a rarely traversed or otherwise hard-to-test conditional branch path. Because the path is so rarely visited during operation of the software, this error might not be detected using a dynamic analysis tool.

In the past, static taint analysis ordinarily has involved identifying taintedness sources and propagating and tracing tainted information interprocedurally and/or globally through paths of execution within a program to determine whether it reaches a taintedness sink. Unfortunately, only incomplete information about the identity of taintedness sources may be available. Moreover, even if such analysis has accurate information about the sources of tainting, it may be difficult to trace the taint through different paths of code operations to a taintedness sink due to overlapping paths, or due to simplifications and abstractions of the memory model that are necessary for practical reasons.

BRIEF DESCRIPTION OF THE DRAWINGS

FIG. 8 is an illustrative drawing showing example struct types that contain nested struct types in accordance with some embodiments.

FIG. 9 is an illustrative screen shot showing a taintedness error report in accordance with some embodiments.

SUMMARY

Figure 1:
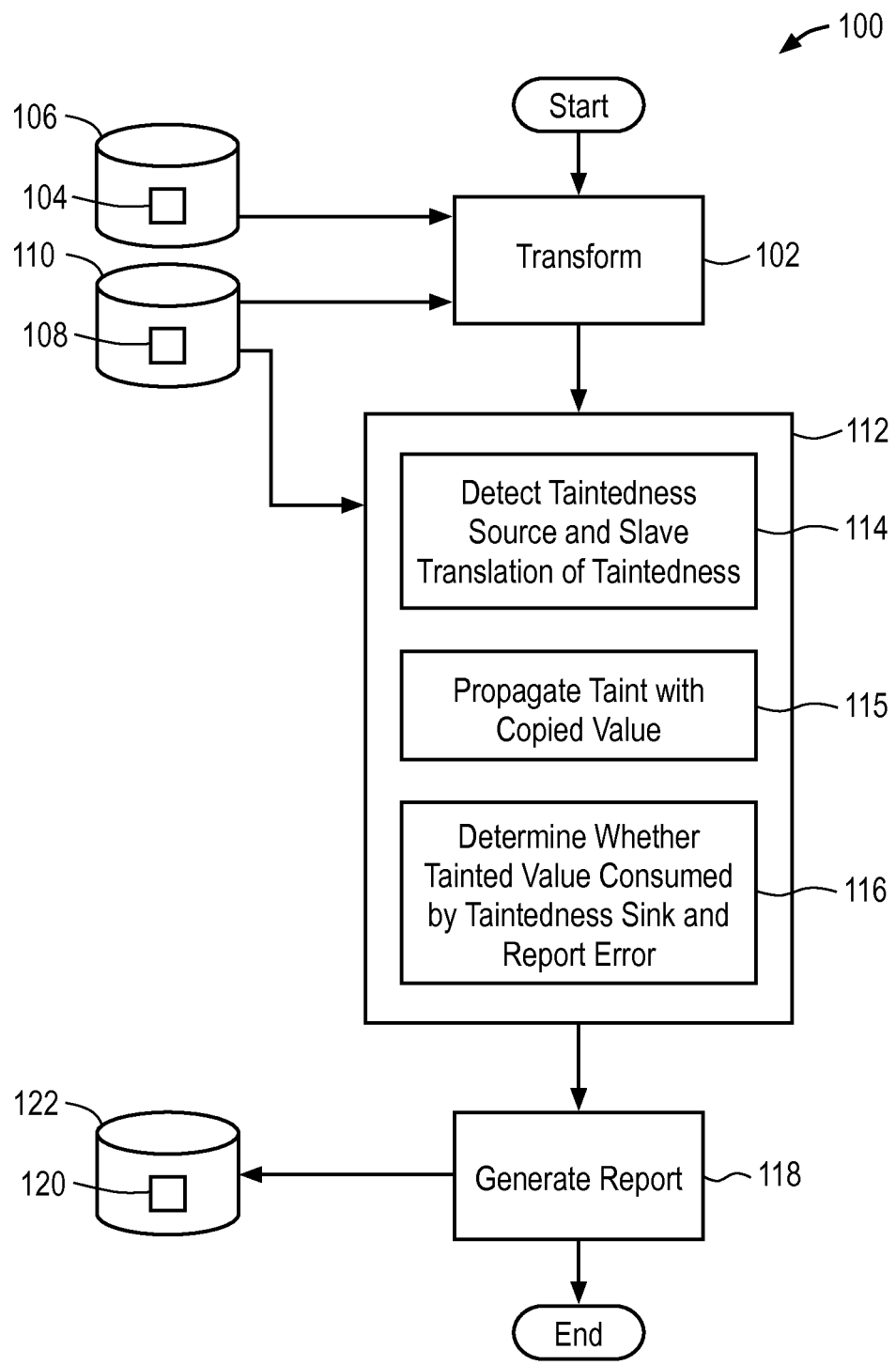
FIG. 1 is an illustrative diagram of a process to evaluate taintedness during static analysis of computer program code in accordance with some embodiments.

In one aspect, a method is provided to infer taintedness in code expressions encoded in a computer readable device. A computer is configured to store a representation of a computer program that is to be evaluated in non-transitory storage media. The computer is configured to search within the representation to identify a pointer cast operation. A determination is made as to whether an identified cast operation involves a cast from a pointer to a raw memory data type to a pointer to a structured data type. A determination is made as to whether the structured data type casted to is associated with indicia of externalness. In response to a determination that the structured data type casted to is associated with indicia of EXTERNALNESS, designating a value addressed by that pointer as tainted. The computer is configured to search within the representation to determine whether a value designated as tainted is consumed by an operation in the program that acts as a taintedness sink.

DEFINITIONS OF SELECTED TERMS

'Cast' as used herein signifies a unary operator that changes the type an expression within another code expression. When the result of a cast operation is used it is interpreted as if the data were of the new type rather than the old type. This reinterpretation applies only for the specified expression, and elsewhere in the program, the type of the casted expression remains unchanged.

'Data Type' as used herein signifies a classification identifying one of various types of data, such as integer, or Boolean, or defined types such as those defined using the 'struct' type in the programming language C that determines the possible values for that data, the operations that can be performed on values of that type and the way values of that type can be stored, for example.

'Path' as used herein signifies a sequence of conditional branching actions and non-conditional operations between them.

'Raw Memory' as used herein signifies an area of a computer storage device ("memory") characterized only by its starting location ("address") and extent (length) in bytes, with no further interpretation or internal structure. The computer language term 'void*' often is used to act as a memory location holder and to indicate raw memory, for example. The computer language term 'char*' also has been used to indicate unstructured memory, for example.

'Sanitize' as used herein signifies taking steps to assure that a given value is suitable for some specific purpose in that it does not have a specific value or range of values that are outside of the define domain of some operation. Sanitization of a tainted value may involve termination of a path through code or may involve substitution of a different value for a tainted value, for example. Different specific sanitization techniques may be required for different kinds of taintedness sinks 'Taint' as used herein signifies information about which values are tainted.

'Tainted' or 'Taintedness' as used herein signifies a property or characteristic of a value or information that it originated from a source outside of control of a computer program and that it has not been sanitized. Note that literature in this field often refers to such a value as being "tainted" even after it is sanitized.

'Taintedness Sink' as used herein signifies the point in a computer program where a tainted value may cause harm, such as a computer program operation that has undefined or undesirable behavior due to the use of certain values or combination of operands, for example. In mathematical terms a taintedness sink can be thought of as any operation with a domain that is a subset of the set of values allowed by the programming language type of its operand. For example, the divisor of a division operation is a taintedness sink because although its integer type allows zero the domain of the divisor excludes zero (that is, division by zero is undefined).

'Taintedness Source' as used herein signifies the origin of a tainted value or tainted information, such as copying of values or a combination of values from outside the address space of a computer program, for example.

'Traversal of a Path' as used herein signifies actual or simulated execution of operations along a path in either temporal or reverse temporal order.

"Value" as used herein signifies the value designated by a variable or expression at a particular point along a particular execution path. A variable or expression may have different values at different points along an execution path.

'Variable' as used herein refers to any storage location (memory or register) that can contain different values at different times, regardless of how it might be addressed.

DESCRIPTION OF THE EMBODIMENTS

The following description is presented to enable any person skilled in the art to create and use a computer system configuration and related method and article of manufacture to determine whether source code allows a tainted value to flow into a taintedness sink. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known data structures and processes are shown in block diagram form in order not to obscure the description of the invention with unnecessary detail. Identical reference numerals may be used to represent different views of the same item in different drawings. Flow diagrams in drawings referenced below are used to represent processes. A computer system is configured to perform these processes. The flow diagrams include modules that represent the configuration of a computer system according to computer program code to perform the acts described with reference to these modules. Thus, the present invention is not intended to be limited to the embodiments shown, but is to be accorded the widest scope consistent with the principles and features disclosed herein.

FIG. 1 is an illustrative diagram of a process 100 to evaluate taintedness during static analysis of computer program code in accordance with some embodiments. Module 102 transforms source code 104 stored in a computer readable device 106 to a transformed representation 108 encoded in a computer readable device 110 suitable for automated static code analysis. In some embodiments, the source code 104 comprises human-written code in a statically-typed language such as C or C++, for example, and the transformed code representation 108 comprises an abstract syntax tree (AST) structure in which many specifics of formatting and identifiers are removed from the source code representation 104 and the remaining code is organized in a tree structure suitable for automated static analysis of the code. In general an AST structure includes a tree-structured representation of the source code as might be typically generated by the preliminary parsing stages of a compiler. The tree structure includes a breakdown of the structure of the code in a non-ambiguous manner, allowing for automated structural searches to be performed. An AST structure can be used to provide a graphical representation of a computer program. Alternatively, instead of an AST, the transformed code may comprise byte code or even object code that retains sufficient source-level information about types and casting, for example.

Module 112 traverses the transformed code structure 108. In some embodiments, module 112 traverses multiple paths. The traversal may proceed in depth-first, post order, or some other order of traversal sufficient to process code operations specified within the chosen representation 108 in either temporal order or in reverse temporal order. In the course of the traversal, module 112 classifies code operations into a set of classifications that includes source, sink and sanitization and also creates and propagates an indication of taintedness state for each value or expression consumed by one or more code operations during the traversal.

In some embodiments, module 112 includes sub-modules 114-116. In the course of the traversal of the code representation 108, module 114 looks for taintedness sources, and in response to identifying a taintedness source, provides an indication in non-transitory storage that a value produced by a taintedness source is tainted. Module 115 looks for propagation (e.g., copying) of a value or expression (hereinafter a 'value'). In response to detecting copying of a value, module 115 determines whether the value that is copied is indicated in non-transitory storage to be tainted, and if the copied value is indicated to be tainted, then the taint is propagated with the copied value. It will be appreciated that although there are certain sanitization operations that a system would be on the lookout for, sanitization often involves preventing some tainted value from reaching a sink, and since 'prevention' often cannot be observed directly, sanitization results often are not readily observable. Module 116 looks for a taintedness sink (e.g., an operation with operands), and in response to identifying a sink, module 112 determines whether an operand value associated with the sink is indicated in non-transitory storage to be tainted. In response to a determination that an operand is tainted, the module 112 reports an occurrence of an error.

Figure 2:
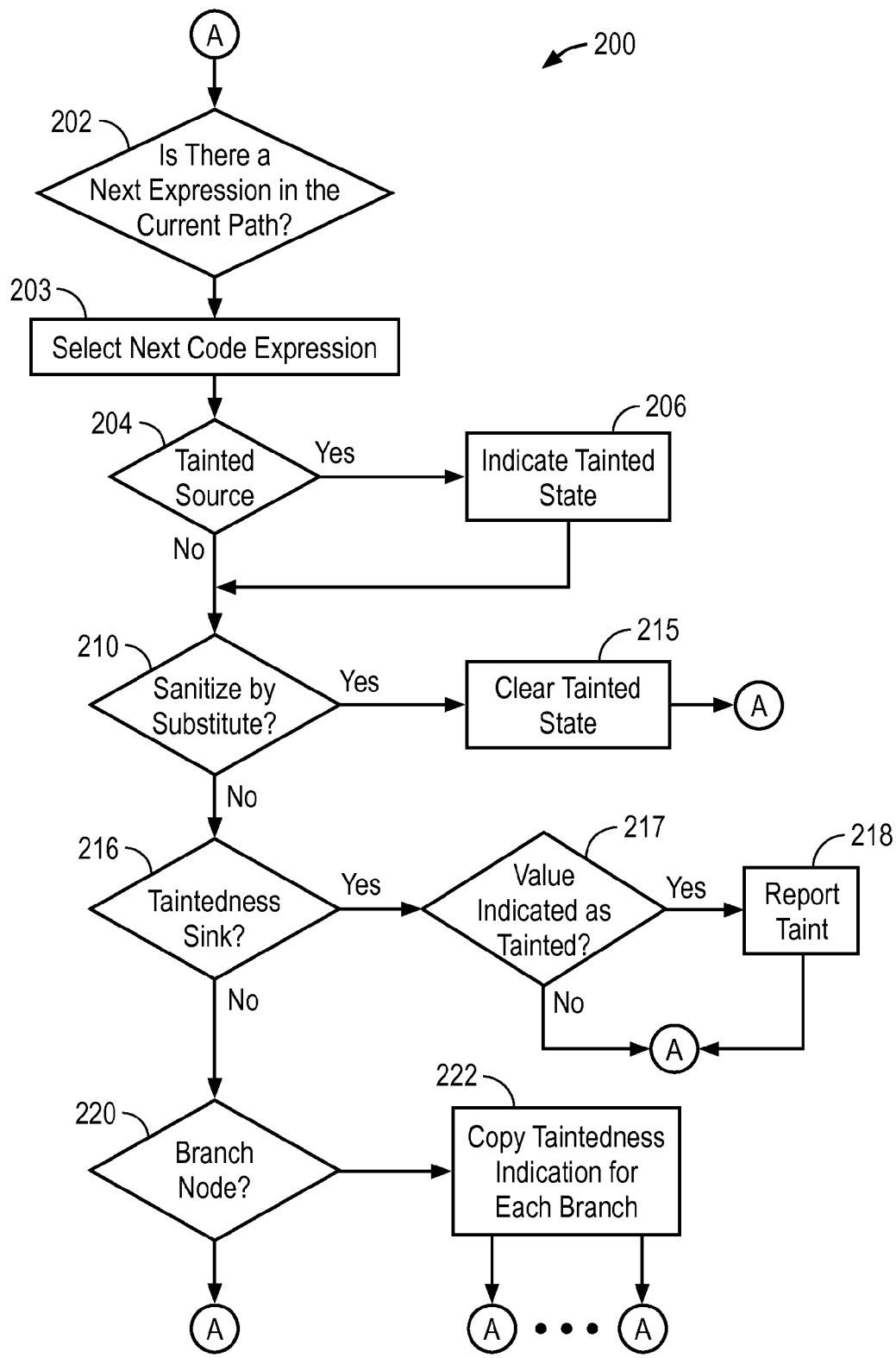
FIG. 2 is an illustrative flow diagram showing details of a path traversal and checker process implemented using the process of FIG. 1 in accordance with some embodiments.

FIG. 2 is an illustrative flow diagram showing details of a path traversal and checker process 200 implemented by module 112 in accordance with some embodiments. The illustrative process 200 traverses and checks a path in a single pass. The process 200 also can operate to traverse and check multiple paths in parallel. The process 200 includes multiple decision modules that check for different characteristics of code expressions. Decision module 202 determines whether there is another code expression in the current path that has not yet been processed. A path does not have another code expression to be processed if all code expressions that correspond to code operations in the path have been processed. If decision module 202 determines that no further code expressions remain to be processed for the current path, then the traversal for the current path is complete. If on the other hand, decision module 202 determines that there is another code expression to be processed then module 203 selects a code expression that corresponds to a code operation within the path. Decision module 204 determines (checks) whether the selected code expression represents a taintedness source. In response to a determination that the currently selected expression represents a taintedness source, module 206 stores in non-transitory media an indication that a value produced by the taintedness source is tainted.

Decision module 210 determines (checks) whether the currently selected code expression corresponds to an operation that sanitizes a value. Two different kinds of taintedness sanitization are path termination and value substitution, for example. If sanitization through termination is used on the path and the sanitization process identifies taint, then the traversal of the path terminates (not shown). Decision module 210, determines whether the currently selected code expression is sanitized through value substitution. In response to a determination that the currently selected code expression is sanitized through value substitution, module 215 configures a computer system to clear the tainted state and to return to decision module 202 to determine whether there is another code expression to be selected in the path.

It will be understood that sanitization by termination does not necessarily terminate searching or traversal of the entire path that currently is being explored. Rather, sanitation by termination implies that a particular tainted value that was being tracked along that path becomes "dead" in the dataflow sense, meaning there are no further references to it. The taintedness analysis will continue exploring that path—and any further paths the branch off from it—in the event that there are relevant taint-related events for other values. Thus, it will be appreciated that in some embodiments, a search along a given path searches for all taint-related activity along the path "simultaneously"—not on a per-tainted-value basis.

Following a determination at decision module 210 that there is no sanitization by substitution, control flows to decision module 216, which determines whether the currently selected code expression constitutes a taintedness sink. In response to a determination at decision module 216 that the currently selected code expression represents a taintedness sink ('yes' at module 216), decision module 217 determines whether an operand associated with the taintedness sink is indicated (in storage) to be tainted. In response to a determination that an operand is marked as not tainted ('no' at module 217), control flows to decision module 202. In response to a determination that an operand is marked as tainted ('yes' at module 217), module 218 reports an error and traversal returns to module 202.

In response to a determination at decision module 216 that the currently selected code expression does not represent a taintedness sink ('no' at module 216), control flows to decision module 220. Decision module 220 determines whether the currently selected code expression indicates a branch. In response to identification of a branch in control flow ('yes' at module 220), module 222 clones taintedness state for each tainted value of the current path. That is, for each unsanitized tainted value associated with the current (pre-branch) path, module 222 creates a separate taintedness indication in storage for each new branch path. Module 222 configures the computer system to perform a traversal of each new branch path, and control flows to module 202 for each such branch path. Otherwise, if no branch is detected ('no' at module 220), control flows to module 202 and traversal returns to module 202.

It will be appreciated that path traversal may include additional modules (not shown) and that in alternative embodiments, order of modules involved in path traversal may vary.

Figure 3:
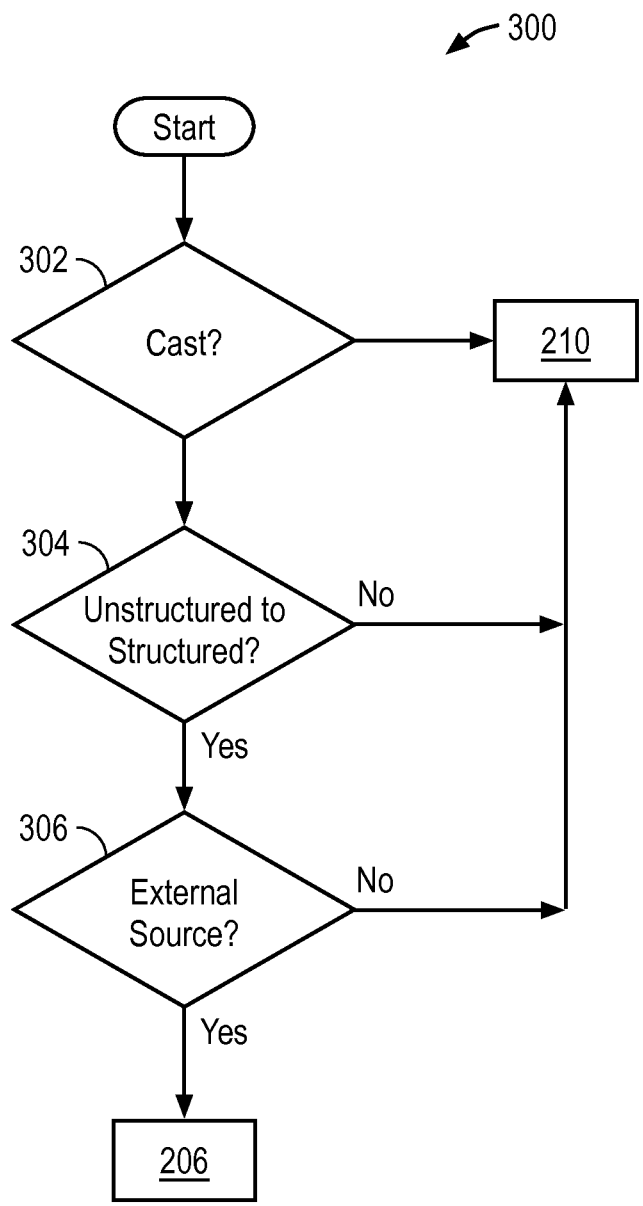
FIG. 3 is an illustrative drawing showing a process implemented using the process of FIG. 1 to determine whether a code expression represents a taintedness sources in accordance with some embodiments.

FIG. 3 is an illustrative drawing showing certain details of a process 300 to determine whether a code expression represents a taintedness source in accordance with some embodiments. In particular, process 300 of FIG. 3 implements the module 204 in some embodiments. Decision module 302 determines whether a currently selected code expression in a path represents an occurrence of a cast operation. In response to a determination by decision module 302 that there is no occurrence of such a cast ('no' at module 302), process control flows to module 210 of FIG. 2. Otherwise ('yes' at module 302), control flows to decision module 304, which determines whether the identified cast operation involves a cast of a pointer to raw memory to a pointer to a more structured data type. In accordance with some embodiments, a 'more structured' type includes aggregate, structure or record types. A cast of a pointer from a pointer to an unstructured type to a pointer to a more structured type is indicative of the possibility that data that the pointer points to is tainted. In general, this follows from the combination of two factors. First, computer system mechanisms for copying data in and out of processes tend to be generic and do not tend to be aware of specific structured types employed in the programs that use them, so they are typically specified in terms of generic, raw-memory types. Second, programmers generally do not use type casts without a reason, so it can be assumed that the value being cast has the pointer-to-raw-memory type that it does because somewhere else in the program, where the data originated, that was the only type information available.

In response to a determination by decision module 304 that the identified cast is not from a pointer to raw memory to a pointer to a more structured type, ('no' at module 304), process control flows to module 210 of FIG. 2. Otherwise ('yes' at module 304), control flows to decision module 306, which determines whether the type to which the pointer is cast comprises indicia of its having come from a tainted source such as an external source outside the address space of the program. In response to a determination by decision module 306 that the source is tainted ('yes' at module 306), process control flows to module 206 of FIG. 2. Otherwise, ('no' at module 306), process control flows to module 210 of FIG. 2.

Figure 4:
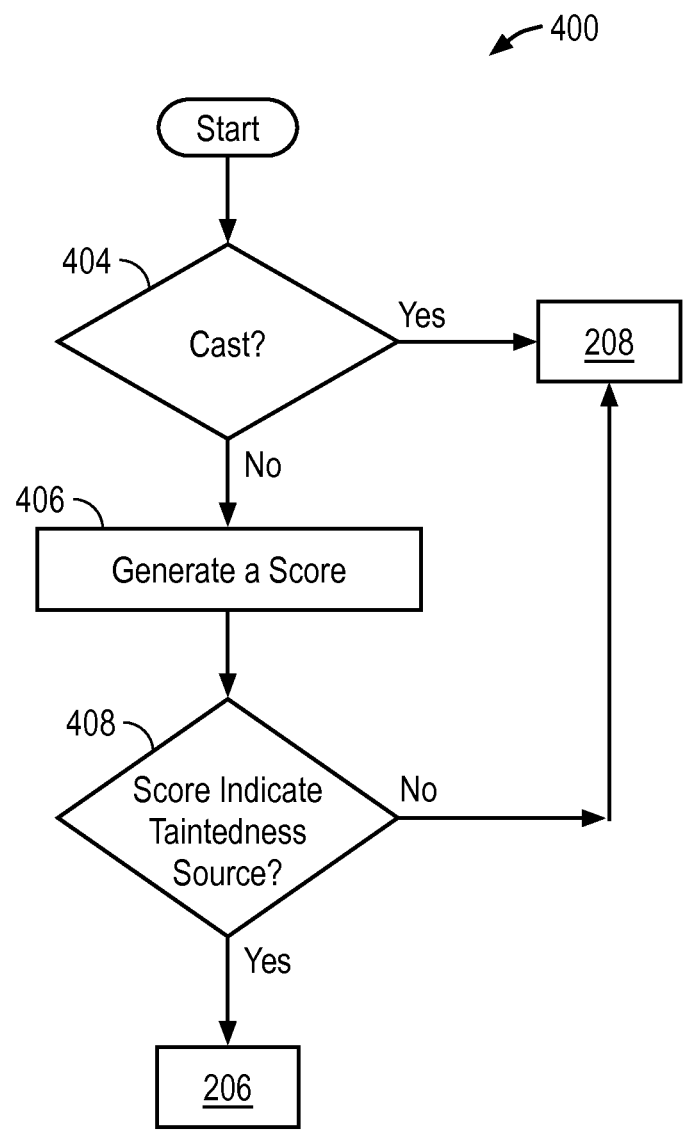
FIG. 4 is an illustrative drawing of a process implemented using the process of FIG. 1 to evaluate whether a type to which a pointer is cast suggests that the pointer points to tainted data in accordance with some embodiments.

FIG. 4 is an illustrative drawing of a process 400 to evaluate whether a type to which a pointer is cast suggests that the pointer points to a tainted data in accordance with some embodiments. The illustrative process 400 is used to implement module 306 of FIG. 3 in some embodiments. Module 402 inspects the source structure type to which a pointer is cast to identify factors that influence a determination of whether a pointer points to an indirectly tainted source. As used herein, an 'indirectly tainted source' is a storage location into which tainted data was previously stored, perhaps at a point not directly recognized by the analysis. An 'indirectly tainted source' is a storage location that is 'indirectly', or, inferredly tainted either because the original, 'direct' taintedness source itself cannot be observed or the data flow could not be followed all the way from the direct taintedness source, but an indication can be observed that tainting likely occurred elsewhere.

Certain factors referred to herein as 'exclusions' are considered sufficient indications that the source is not a taintedness source. Other factors that are not exclusions are evaluated collectively using a scoring system to determine whether to designate a source type as a taintedness source.

Tables 1A and 1B set forth factors used to evaluate whether a pointer to raw memory is cast to a pointer to data that is internal to or external to a computer program under evaluation in accordance with some embodiments. Generally, taintedness is more likely to be associated with external activities than with internal activities. Therefore, indicia of whether an activity is internal or external to a computer program also are an indication of whether it is more likely to be tainted. In accordance with some embodiments, data that is internal to a process is regarded as being not tainted, and data that is external to a process is regarded as being tainted.

Computer programs consist primarily of three activities: operations (such as arithmetic) on data, decision making (conditional branching), and communication (conveyance of data from some "producer" to some "consumer"). As such, computer programs are constantly communicating in ways large and small. The vast majority of this communication is strictly internal to a single computational process; the process is essentially communicating with itself It is both possible, due to the degree of control exercised by the programmer and the guarantees provided by the computer architecture, and necessary, for computational efficiency reasons, for internal communications to take many 'short cuts' in the formation of the 'messages' being communicated.

External communication, whether directly between two processes running on one computer, from a process to long-term storage (e.g., a disk file) and then later to another process, or between processes running on potentially different computers across a network, operates under a different set of restrictions and costs. For example, external communication tends to be organized to pack information into the smallest amount of space possible, formatted in a way that enables other processes, possibly on other, different sorts of computers, to reliably and unambiguously interpret the data. These characteristics that are typically associated with external communication also can be associated with internal communication, but there is a significantly greater correlation of these characteristics with external communication than with internal communications, in part because some of these characteristics are inconvenient for programmers to employ so they would be unlikely to do so unnecessarily for strictly internal communication.

Table 1A lists factors indicative that a pointer to raw memory is cast to a pointer to data that is internal to a process. Table 1B lists factors indicative that a pointer to raw memory is cast to a pointer to data that is external to a process.

TABLE 1A

Pro-Internalness Factors

| FACTOR | COMMENT |
|---|---|
| A pointer to a structure type having a field that has a pointer type | (Strictly internal, so -> NOT external) |

TABLE 1B

Pro-Externalness Factors

| FACTOR | COMMENT |
|---|---|
| Number of fields | Larger number of fields suggests external (Suggests communication packet, weakly-> external) |
| Diversity of field sizes | Greater field diversity suggests external (Suggests careful packing->communication packet) |
| Bit Fields | Suggests external (Suggests packing->communication packet) |
| Unsigned field types assumed to represent counts or sizes | Suggests external (Careful choice of types suggests packing-> communication packet) |
| Packing or the absence of gaps in structure layout | Suggests external (communication packet suggests communication packet and portability of layout) |

A pointer to a structure type that has a field with a pointer type acts as an exclusion because memory addresses are usually only meaningful within a single process or on a single machine. Structure types used for intraprocess communication frequently contain pointers to other data within the same process, but such pointers are only meaningful on the computer machine that first created them and usually only within the specific process that created them. Data that arrives from an untrusted source such as over a network or from a different process or from some external storage such as a disk drive or other mass storage is more likely to have a larger number of fields and a greater diversity of field sizes than is data that is transmitted from a trusted source due to the desire to pack the maximum information into the minimum space (bits).

Continuing with the explanation of the flow of FIG. 4, module 404 determines whether the data type that is casted to has characteristics that are exclusions. See, Tables 1A-1B. If so, then control flows to module 210 of FIG. 2. If not, then module 406 generates an externalness score based upon characteristics of the source structure type to which the pointer was cast that are identified by module 402. It will be appreciated that in some embodiments, criteria for determining which factors are exclusions and how other factors are to be combined, weighed and scored may be specified or configured in accordance with user needs or requirements of a particular application.

There is considerable room for creativity in configuring module 406 to generate a score as a function of characteristics of the source structure type to which the pointer is cast such as, weighting them, combining them into a single scalar quantity, and finally judging whether that value exceeds a relevant threshold, for example. The diversity of field sizes, the use of bit fields, and the use of unsigned types may be expressed, for example, as densities rather than as absolute amounts. One might, for example, take the logarithm of the number of fields, add the number of different field sizes, add an extra two points for bit fields, subtract one for a small number of signed fields or two for a larger number of signed fields, subtract two for any floating point fields, and add one point if the overall size of the structure is a multiple of four and there are no gaps in its layout. This might yield a score of around ten for a typical network packet header structure, whereas a typical "internal" type might yield a score around four. Assuming these values a threshold of eight should distinguish them with reasonable reliability.

Decision module 408 determines whether the score indicates that the source structure type is external by comparing the computed score to an empirically determined threshold value. If not external, then control flows to module 210 of FIG. 2. If determined to be external, then control flows to module 206 of FIG. 2.

FIRST CODE EXAMPLE

TABLE 2

First Code Example

```
1  int array[2]
2  void f(some_struct_type* p) {
3     int tainted =
      ((external_looking_type*)p->raw_memory_pointer_field)-
      >some_field;
4     if (some condition) {
5        if (tainted <0)
6           return;
7        if (tainted > 1)
8           tainted = 1; /* not really tainted at this point */
9     }
10    array[tainted]=0;
11 }
```

In this example, the value associated with code "int tainted" (line 3) is inferred to have a provenance that is external to the current process based upon the cast of a raw memory pointer to an external looking type. An operating system or utility program may have copied the value from some source external to the process, for example. In this example, the cast superimposes an external-looking structure type onto an unstructured type. Thus, the variable value "tainted" is treated as being tainted. The operation represented by the code "array [tainted]=0" (line 10) is a taintedness sink that uses a tainted value to assign the value 0 to one of the slots of a two-slot array. Thus the field 'some field' is treated as being tainted and that taintedness is copied into the variable 'tainted'. The code of line 4 represents a branch operation in the code base upon some (example) branch condition. The code of lines 5-6 represents a sanitization by termination operation. The code of lines 7-8 represents a sanitization by substitution operation.

Figure 5:
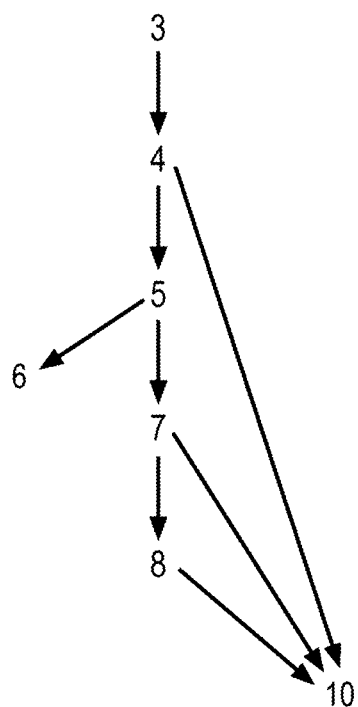
FIG. 5 is an illustrative path diagram showing different paths through example code in accordance with some embodiments.

FIG. 5 is an illustrative path diagram showing different paths through the code of the second example shown in Table 2. Each numbered node in the collection of paths in the drawing corresponds to an identically numbered line of code in Table 2. The path traversal process of FIG. 1 may proceed in forward order from the example taintedness source, "int tainted" (line 3) to the example taintedness sink "array [tainted]=0" (code line 10) or may proceed in reverse order from the example taintedness sink "array[tainted]=0" (code line 10) to the example taintedness source, "int tainted" (code line 3). One goal of embodiments disclosed herein is to commence the traversal close to the taintedness source or close to the taintedness sink, and both forward path traversal and reverse path traversal can achieve this objective.

If the condition at code line 4 is satisfied (true), then control branches to code line 5. The code of line 5 determines whether the value of the variable parameter "tainted" is a non-negative integer. If the condition code line 5 is satisfied (tainted<0), then control branches to code line 6, where the path ends. The path from code line 5 to code line 6 is an example of sanitization by termination. However, if the condition code line 5 is not satisfied (false), then control branches to code line 7.

At code line 7, a determination is made as to whether the value of the variable "tainted" is an integer value greater than 1. If the condition at node 7 is satisfied (tainted>1), then control branches to code line 8 where the assignment of the non-tainted value "1" to "tainted" resets its tainted status, which constitutes sanitization through substitution and control moves to code line 10 since. However, if the condition at node 5 is not satisfied, then control branches to code line 10, since the value "tainted" is determined to be safe (i.e., suitable as an index for "array").

Once only one test remains one branch of that test will either terminate or substitute and the other branch merely leaves the formerly-tainted value sanitized (in effect, "by exclusion")

However, if the condition at code line 4 is not satisfied (false), then control branches to code line 10, and skips the sanitization by termination operation, and skips the sanitization by substitution operation of. In that case, the value of "tainted" remains tainted when used by the taintedness sink "array[tainted]=0" and an error is reported.

It will be appreciated that as an alternative to path traversal, a determination of whether a value identified as being taintedness source is used without sanitization by a taintedness sink can be achieved though data flow analysis in which an abstract graphical representation of the direct flow of data within the program is constructed and the tainted property is propagated over this graph.

SECOND CODE EXAMPLES

Five example functions are set forth: 'good1', 'good2', 'bad1', 'redmond_nobug', and 'redmond_bug'. A first pair of examples good1 and bad1 is provided to show a relatively simple example function (good1) in which data is determined to be untainted and a similar contrasting function (bad1) in which data is determined to be tainted. An additional example, 'good2', shows an important exception. A second pair of examples redmond_bug and redmond_nobug is provided to show a somewhat more complex example function (redmond_nobug) in which data initially is determined to be tainted but is properly sanitized along all paths to a taintedness sink and a similar contrasting function (redmond_bug) in which data is also initially determined to be tainted but in which there is a path to a taintedness sink along which tainted data is not sanitized. Appendix A, which is expressly incorporated herein by this reference, sets forth a code listing for 'good1', 'good2' 'bad1', 'redmond_nobug', and 'redmond_bug'. Appendix B which is expressly incorporated herein by this reference, sets forth an example AST structure for the function bad(1).

Table 3 sets forth custom 'struct' type data structures that are declared at example code lines 3-27 of the code listing and that are applicable to all four examples.

TABLE 3

Declared Structures

```
3   struct network_packet_header {
4       unsigned char a, b, c, d;
5       unsigned short e, f, g, h;
6       unsigned int i, j;
7       unsigned long long k;
8   };
11  struct otherwise {
12      char *p;
13      unsigned b;
14  };
16  struct intermediate
17      void *raw;
18  };
20  struct foo {
21      void *raw1;
22      char *raw2;
23      struct intermediate *inter;
24      struct {
25          void *raw3;
26      } str_fld;
27  };
```

Table 4 sets forth a two-element array declared at line 29 of the example code listing and applicable to all four examples.

TABLE 4

Declared Array

```
29  int array[2];
```

Table 5 sets forth the example 'good1' function declared at example code lines 31-36 of the code listing.

TABLE 5

Example 'good1' function

```
31  void good1(struct foo *p)
32  {
33      struct otherwise *untainted = (struct otherwise *)p->raw1;
34
35      array[untainted->b] = 0;
36  }
```

Table 6 sets forth the example 'bad1' function declared at lines 38-45 of the example code listing.

TABLE 6

Example 'bad1' function

```
38  void bad1(struct foo *p)
39  {
40      struct network_packet_header *tainted = (struct network_packet_header *)p->raw2;
41
42      array[tainted->a] = 0;
45  }
```

Table 7 sets forth the example 'good2' function declared at lines 65-80 of the example code listing.

TABLE 7

Example 'good2' function

```
65  void good2 (void *param)
66  {
67      struct network_packet_header *untainted = (struct network_packet_header *) param;
```

TABLE 7-continued

Example 'good2' function

```
68
69      array[untainted->a] = 0;
80  }
```

Table 8 sets forth the example 'redmond_nobug' function declared at example code lines 102-122 of the code listing.

TABLE 8

Example 'redmond_nobug' function

```
102 void redmond_nobug(struct foo *p)
103 {
104     struct network_packet_header *p_buffer =
105         (struct network_packet_header *)p->inter->raw;
106     struct otherwise *p_other = (struct otherwise *)p->raw2;
107
108     if (p_buffer->a = 3) {
109         p_other->b = 0;
110         goto label;
111     }
112
113     if (p_buffer->b >= 2) {
114         return;
115     }
116
117     p_other->b = p_buffer->b;
118
119 label:
120     array [p_other->b] = 0;
121 }
```

Figure 6:
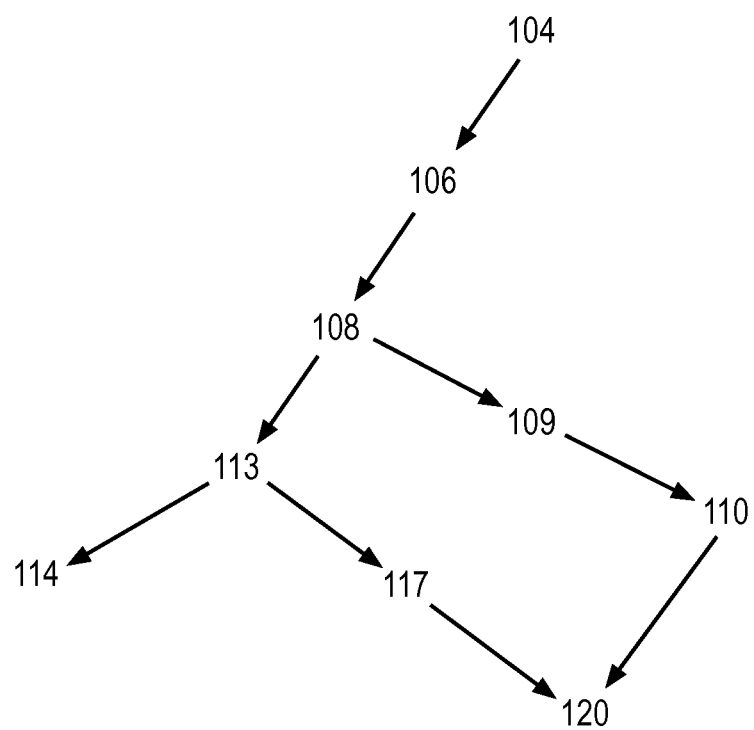
FIG. 6 is an illustrative path diagram showing different paths through example code in accordance with some embodiments.

FIG. 6 is an illustrative path diagram showing different paths through the code of the second example shown in Table 8. Each numbered node in the collection of paths in the drawing corresponds to an identically numbered line of code in Table 8. The path traversal process of FIG. 1 may proceed in forward order or reverse order along the paths.

Table 9 sets forth the example redmond_bug function declared at lines 79-100 of the example code listing.

TABLE 9

Example "redmond_bug" function

```
79  void "redmond_bug" (struct foo *p)
80  {
81      struct network_packet_header *p_buffer =
82          (struct network_packet_header
                *)p->inter->raw;
83      struct otherwise *p_other = (struct otherwise *)p->raw2;
84
85      if (p_buffer->a == 3) {
86          p_other->b = 0;
87          goto label;
88      }
89
90      if (p_buffer->b >= 2) {
91          return;
92      }
93
94      p_other->b = p_buffer->b;
95
96  label:
97      array[p_buffer->b] = 0; /* should be "p_other->b" */
100 }
```

Figure 7:
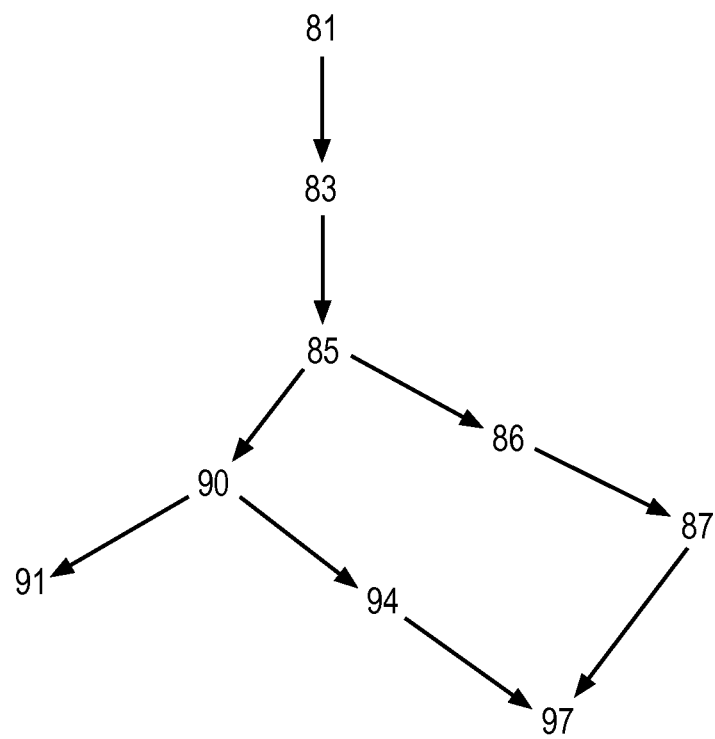
FIG. 7 is an illustrative path diagram showing different paths through example code in accordance with some embodiments.

FIG. 7 is an illustrative path diagram showing different paths through the code of the second example shown in Table 9. Each numbered node in the collection of paths in the drawing corresponds to an identically numbered line of code in Table 8. The path traversal process of FIG. 1 may proceed in forward order or reverse order along the paths.

Discussion of the "good1" Function

The "good1" function or procedure is defined to be compiled to configure a computer system. Line 31 of the example code listing provides a function definition "void good1 (struct foo *p)" indicating that the variable parameter "p" points to the structure type "struct foo". Thus, the memory used by the function "good1" is laid out in accordance with the structure type declared as "struct foo". Line 33 of the code listing defines a new variable, "untainted", which is defined as being a pointer to structure type "struct otherwise". See left side of "=", which recites, "struct otherwise * untainted". Line 33 of the code listing initializes the new variable, "untainted" to be a copy of the pointer field 'p->raw1' and thus providing access to the same memory location. Line 33 casts the pointer "p->raw1" to a pointer to the structure type "struct otherwise", ensuring that this initial value for "untainted" has the same type as "untainted". It will be appreciated that "struct foo" defines the field "raw1" as a pointer to the "void" type, which in the programming languages C and C++, for example, is by definition, a non-specific, and therefore unstructured, type. However, as a result of the cast in line 33, a compiler system (not shown) that subsequently compiles the code listing, uses the variable "untainted" to access the memory location pointed to by "p->raw1" defined in structure "struct foo" in a structured manner using structure type "struct otherwise".

An act of casting from a pointer to a 'weaker' (i.e. unstructured) type (e.g., "void") to a pointer to a more specific (i.e. more structured) type (e.g. "struct otherwise") is sometimes referred to as 'downcasting'. Persons skilled in the art will understand that the term downcasting refers to an assumed graphical depiction of types (not shown) in which weaker, less structured and more generic types are displayed toward the top of the depiction and stronger, more structured, more specific types are displayed toward the bottom of the depiction.

Line 33 of the code listing indicates that the numerical value 0, a constant, is to be stored to a particular memory location of the array defined at line 29 (Table 4). Specifically, the constant value 0 is to be stored to the memory element identified by "untainted->b" ("untainted" points to "b") of the array. Stated differently, the index to the array is determined by the contents of "untainted->b". Note that the field "b" is a symbolic field within the structure "struct otherwise".

Discussion of 'good2' Function

The 'good2' function is defined to be compiled to configure a computer system. Line 67 casts a parameter value 'param' (not a data type) to a pointer to a structure "struct network_packet_header". Such a function might be used with a generic 'call-back' mechanism that applies the argument to multiple different types. The argument to such function quite possibly comes from elsewhere within the same process and thus, is not especially likely to be tainted.

Discussion of the "bad1" Function

The "bad1" function is defined to be compiled to configure a computer system. Line 38 of the example code listing declares a function definition "void bad1 struct foo *p)" indicating that the variable parameter "p" points to the structure "struct foo". Thus, the memory used by the function "bad1" is laid out in accordance with the structure type declared for "struct foo". Line 40 of the code listing defines a new variable, "tainted", which is defined as having pointer to structure type "struct network_packet_header". See left side of "=", which recites, "struct network packet_header * tainted". Line 40 of the code listing initializes the new variable, "tainted" to be a copy of the pointer field 'p->raw2' and thus providing access to some memory location. Line 40 casts the pointer "p->raw2" ("p" points to "raw2") to the structure type "struct network_packet_header*", ensuring that this initial value for 'tainted' has the same type as "tainted". It will be appreciated that "struct foo" defines the field "raw2" as a pointer to the "char" type, which in the programming languages C and C++, in this example, is an unstructured type used to indicate raw memory. Note that in other situations, a "char*" may be a "string", which is a structured type, or just raw byte data. As a result of the cast in line 40, a compiler system (not shown) that subsequently compiles the code listing, uses the variable "tainted" to access the memory location pointed at by "p->raw2" defined in structure "struct foo" in a structured manner using structure "struct network_packet_header". Line 42 of the code listing indicates that the numerical value 0, a constant, is to be stored to a particular memory element of the array defined at line 29 (Table 2). Specifically, the constant value 0 is to be stored to the memory element identified by "tainted->a" ("tainted" points to "a") of the array. Stated differently, the index to the array is determined by the contents of "tainted->a". Note that the field "a" is a symbolic field within the structure "struct network_packet_header".

Discussion of "redmond_nobug" Function

The "redmond_nobug" function is defined to be compiled to configure a computer system. Line 102 of the example code listing declares a function definition "void redmond_nobug (struct foo *p)" indicating that the variable parameter "p" points to the structure "struct foo". Thus, the memory used by the function "redmond_nobug" is laid out in accordance with the structure of "struct foo". Lines 104-105 of the code listing define a new variable, "p_buffer", which is defined as being a pointer to structure "struct network_packet_header". See left side of "=", which recites, "struct network_packet_header *p_buffer". Referring to the right side of the "=", lines 104-105 of the code listing initializes the new variable, "p_buffer" to be a copy of the pointer field "p->inter->raw", which is itself a pointer field of the structured object pointed to by "p->inter", thus to the same memory. It will be appreciated that "struct intermediate" defines "raw" as pointing to a memory location of the "void" type. Lines 104-105 cast of the pointer "p->inter->raw" ("p" points to "inter" points to "raw") to a pointer to the structure "struct network_packet_header", ensuring that the initial value of the variable "p_buffer" has the same type as "p_buffer".

Line 106 of the code listing defines a new variable, "p_other", which is defined as being a pointer to structure "struct otherwise". See left side of "=", which recites, "struct otherwise *p_buffer". Line 106 of the code listing initializes the new variable, "p_other" to be copy of the "p->raw2" and thus providing, which is within the structure "struct foo". As explained above, "struct foo" defines field "raw2" as pointing to a memory location of the "char" type. Referring to the right side of the "=", line 106 casts the pointer "p->raw2" ("p" points to "raw2") to point to the structure "struct otherwise".

Lines 108-120 of the code listing provide three example paths to the final step (line 120) in the process defined by the code, which is to store a constant value 0 to the array defined at line 29. An intended purpose of the code of lines 108-120 is to sanitize a memory location "p_other->b" whose content indicates the index of an element of the array in which the constant value 0 is to be stored. Note that in this example, the array is defined as "int array[2]", which signifies that it has only two elements, and therefore, has only two possible valid index values, i.e. 0 and 1. (In the "C" programming language array indexes count starting from zero.)

FIG. 6 is an illustrative path diagram showing different paths through the code of the "redmond nobug" function example. A first path through proceeds from line 104 to line 106 to line 108 (condition=false) to line 113 (condition=false) to line 117 to line 120. The code of line 108 tests whether the value of the variable "p_buffer->a" ("p_buffer" points to "a") is 3. Assuming not, then control flows to the code at line 113, and a determination is made as to whether the value of the variable "p_buffer->b is greater than or equal to 2. Assuming not, then control flows to the code at line 117, and the value of "p_buffer->b" is copied to "p_other→b". Next, at line 120 the constant value 0 is stored to the array at the index location identified by the value of "p_other->b". For this path, the code on line 113 tests the value of "p_buffer->b", and found it to be not greater than or equal to 2, and the code of line 117 copies the value of contents of "p_buffer->b" into "p_other->b. Therefore, it is known that the index 0 or 1 is used to identify the element of the array into which to store the value 0. Since the array has two elements (as defined at line 29), there is no problem. The code on line 120 causes the value 0 to be stored to the element identified by index value "p_other->b", which is known to be 0 or 1 due to the test at line 113, which sanitized the value.

A second path proceeds from line 104 to line 106 to line 108 (condition=true) to line 109 to line 110 to line 120. In this second path, assume that the code at line 108 determines that the value of the variable "p_buffer->a" is 3. The code on line 109 causes assignment of a value 0 to memory location "p_other→b". The code on line 110 causes control to jump to line 120 where the code causes the value 0 to be stored to the element identified by index value "p_other->b", which is known to be 0 due to the assignment at line 109, which sanitizes that location by substitution. Thus, in this second path, "p_other->b" is used as a valid (i.e. non-tainted) index to the two-element array defined at line 29 (line 120).

A third path proceeds from line 102 to line 106 to line 108 (condition=false) to line 113 (condition=true) to line 114. This third path does not reach the code at line 120 and does not result in loading the constant value 0. The third path returns without completion since "p_other->b" contains a value other than 0 or 1. This third path is an example of sanitization by termination, where the path terminates once it has determined that a tainted value is, in fact, unsuitable for its intended use.

Discussion of "redmond_bug" Function

FIG. 7 is an illustrative path diagram showing different paths through the code of the "redmond bug" function example. The code for the "redmond_bug" function (lines 79-100) is identical to that of the "redmond_nobug" function (lines 102-121) except that line 97 of the "redmond_bug" function uses the values of "p_buffer->b" to identify the index to the array into which the constant value 0 is to be stored. A tainting problem arises with a second path, line 81 to line 83 to line 85 to line 86 to line 87 to line 97. Line 86 assigns a value 0 to "p_other->b", and line 97 uses the value of "p_buffer->b" to determine the index to the array into which to load the value 0. However, as explained above, there is no test of the value of "p_buffer->b" on the second path (i.e. line 90 is not a part of the second path). Therefore, the index for contents of the array used in the "redmond_bug" function is not sanitized and thus remains tainted, allowing the possibility that an illegal index value, greater than 1, will be used.

Taintedness Testing of "good1" and "bad1" and "good2"

As to "good1", decision module 302 determines that the function "good1" involves a cast at line 33. Decision module 304 determines that the cast is from raw memory type "void*" to a structured type "struct otherwise*". Since the structure type casted to, "struct otherwise*", contains a field of a pointer type, "char* b", decision module 306 determines that the data structure type "struct otherwise" is likely to be internal, and therefore, the cast at line 33 is not identified as a taintedness source.

As to "bad1", decision module 302 determines that the function "bad1" involves a cast at line 40. Decision module 304 determines that the cast is from raw memory type "char*" to a structured type "struct_network_packet_header*". Since the structure type casted to, "struct network_packet_header", contains no 'exclusions' and includes indicia of taintedness, e.g. a large number of unsigned fields of different sizes that pack well, decision module 306 determines that the structure type "struct network_packet_header" is likely to be external, and therefore, the cast at line 40 is identified as a taintedness source. The tainted propagation mechanism now begins to remember that the fields of "*tainted" are tainted and checks to see if the taint-sensitive operand, "tainted->a", is known to be tainted since it is a field of "*tainted" that is known to be tainted, and so a taintedness error is reported.

As to "good2", decision module 302 determines that the function "good2" involves a cast at line 67. Module 304 determines that the pointer being cast is a parameter and thus not sufficiently likely to be a pointer to external data. Therefore, decision module 304 causes control flow to return to module 208.

Taintedness Testing of "redmond_bug" and "redmond_nobug"

As to "redmond_nobug", decision module 302 determines that the function "redmond bug" involves a cast at lines 104-106. Decision module 304 determines that the cast is from unstructured raw memory type "char*" to a structured type "struct network_packet_header". Since the structure type casted to, "struct network_packet_header", contains no 'exclusions' and includes indicia of taintedness, a large number of unsigned fields of different sizes that pack well, decision module 306 determines that the data structure type "struct network_packet_header" is likely to be external, and therefore, the cast at line 40 is identified as a taintedness source.

As to "redmond_bug", processing is essentially the same with the following being a few of the important differences. As to each of the three possible paths, the value consumed at taintedness sink "array[p_buffer->b]=0;" at line 97 is observed to be "p_buffer->b". As to the second path, decision module 216 determines a tainted variable actually used in the taintedness sink at line 97 is "p_buffer->b" and module 218 reports a taintedness error.

Implicit Cast

The above computer program code examples good1, good2, bad1 involve 'explicit' casts in which the code explicitly sets a forth a cast operation involving a cast to a pointer to a more structured data type. Alternatively, computer program code may include an 'implicit' cast in which case a compiler of the code understands that a cast to a more structured data type is required and automatically performs the cast despite the absence of an explicit statement of a cast operation in the code.

The following Table 10 is an example of a bad2 code function that implicitly sets forth a cast operation using the C programming language. Note that the Table 3—Declared Structures indicates that void* is associated with raw1 and that char* is associated with raw2. Also, note that Table 6—Example 'bad1' function involves the raw2, and Table 10—Example 'bad2' function involves raw1. In the C programming language, for example, a conversion from void* type to a more structured pointer type can be implicit. That means that in some embodiments, a C compiler can recognize an implicit cast operation from void* to a more structured type and does not require program code to explicitly set forth a cast operation in order to achieve the cast. In the bad2 code of Table 10, for example, a C programming language compiler understands that the bad2 code implicitly sets forth a cast from the void* type to a pointer to a more structured data type.

TABLE 10

Example 'bad2' function

```
void bad2(struct foo *p)
{
    struct network_packet_header *tainted = p->raw1; /* implicit
conversion from void* */
    array[tainted->a] = 0;
}
```

It will be appreciated that decision module 302 of FIG. 3 determines whether a currently selected code expression in a path represents an occurrence of a cast operation regardless of whether the cast is set forth in the code explicitly or implicitly.

Nested Structure Types

FIG. 8 is an illustrative drawing showing example struct types that contain nested struct types. These are slightly simplified versions of the actual struct types for internet IP and TCP packet headers. The u_char, u_int8_t, u_int32_t, etc. types are all unsigned integer types. If a struct type contains fields which are themselves of struct type (as in the above 'nread_ip' example) the fields of that "nested" struct are considered, recursively, as if they were fields of the containing struct. Thus we effectively "flatten" such nested struct types. Note that this would not be true if there were a pointer to struct type. If a nested struct type contains an exclusion (such as a pointer type field) that should be interpreted to rule out the containing structure type.

FIG. 9 is an illustrative screen shot showing a taintedness error in accordance with some embodiments. After identifying errors, information retained in the AST regarding the original source code locations is used to show the error in the context of the original source code. The illustrative screen shot shows example taintedness error reports for the "bad1" and "redmond_bug" code examples.

While the above embodiment proceeds by first identifying a tainted source and then determining whether the tainted source is consumed by a sink, thereby rendering that sink a taintedness sink, the order, alternatively, can be reversed. Instead, proceed by first identifying a sink and then determining whether a tainted source is consumed by the sink, thereby rendering that sink a taintedness sink. In this alternative approach, once a sink is identified, source data consumed by the sink are traced backwards in the execution path to determine whether or not they are tainted.

It will appreciated that whether using forward or reverse tracing, an advantage of using cast operations to identify a tainted source is that cast operations ordinarily are performed in close functional proximity to a sink that is to consume the data. Therefore, the amount of tracing through an execution path required to ascertain whether the data is consumed by a tainted sink (forward tracing) or to determine whether data consumed by a sink that is tainted (reverse tracing) typically is relatively short.

As an alternative, a data flow graph may be employed instead of tracing. A dataflow graph consists of nodes, representing program variables, other sources of values such as function call return values, and other sinks of values such as function call arguments, and directed edges between those nodes, representing assignments, function returns, and function argument passing, indicating that data "flows" from the node at one end of the edge to the node at the other. Nodes in such a graph can be identified as tainted sources. Other nodes in such a graph can be identified as taintedness sinks A taint error occurs when there is a path through the graph starting at a tainted source node, following some sequence of directional edges and other nodes, and ending up at a taintedness sink node. A cast from a raw memory pointer to a pointer to structured type that has indicia of externalness would be one source of evidence that the fields of the casted-to structure type should be treated as tainted sources in such a dataflow graph.

Hardware Embodiment

Figure 10:
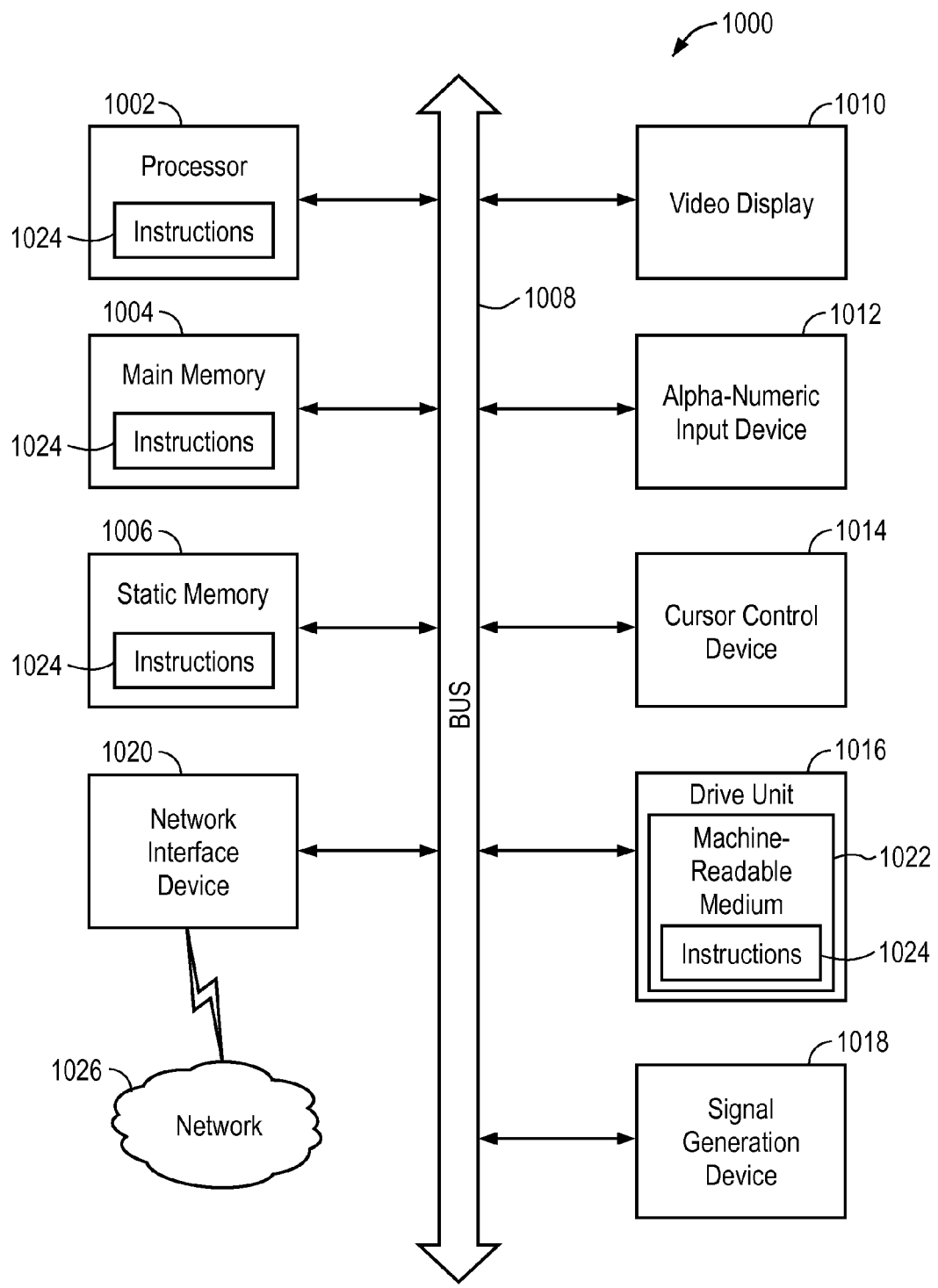
FIG. 10 is a block diagram of a computer processing system within which a set of instructions, for causing the computer to perform any one or more of the methodologies discussed herein, may be executed.

FIG. 10 is a block diagram of a computer processing system within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. In a networked deployment, the computer may operate in the capacity of a server or a client computer in a server-client network environment, or as a peer computer in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a Personal Digital Assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1000 includes processor 1022 (e.g., a central processing unit (CPU), a graphics processing unit (GPU) or both), main memory 1004 and static memory 1006, which communicate with each other via bus 808. The processing system 1000 may further include video display unit 1020 (e.g., a plasma display, a liquid crystal display (LCD) or a cathode ray tube (CRT)). The processing system 1000 also includes alphanumeric input device 1022 (e.g., a keyboard), a user interface (UI) navigation device 1014 (e.g., a mouse, touch screen, or the like), a disk drive unit 1016, a signal generation device 1018 (e.g., a speaker), and a network interface device 1020.

The disk drive unit 1026 includes computer-readable storage device 1022 on which is stored one or more sets of instructions and data structures (e.g., software 1024) embodying or utilized by any one or more of the methodologies or functions described herein. The software 1024 may also reside, completely or at least partially, within a computer readable storage device such as the main memory 1004 and/or within the processor 1022 during execution thereof by the processing system 1000, the main memory 1004 and the processor 1022 also constituting computer-readable, tangible media.

The software 1024 may further be transmitted or received over network 1026 via a network interface device 1020 utilizing any one of a number of well-known transfer protocols (e.g., HTTP).

While the computer-readable storage device 1022 is shown in an example embodiment to be a single medium, the term "computer-readable storage device" should be taken to include a single medium or multiple media (e.g., a centralized or distributed database, and/or associated caches and servers) that store the one or more sets of instructions. The term "computer-readable storage device" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable storage device" shall accordingly be taken to include, but not be limited to, solid-state memories, and optical and magnetic media.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

Therefore, the foregoing description and drawings of embodiments are merely illustrative of the principles of the invention. Various modifications can be made to the embodiments by those skilled in the art without departing from the spirit and scope of the invention, which is defined in the appended claims.

Appendix A and Appendix B

Appendix A is a code listing. Appendix B is an Abstract Syntax Tree produced from the code listing of Appendix A.

Appendix A and Appendix B are expressly incorporated herein by this reference.

The invention claimed is:

1. A method to infer taintedness in code expressions encoded in a computer readable device comprising:
    configuring a computer system to,
    store a representation of a computer program that is to be evaluated in non-transitory storage media;
    identify within the representation a pointer cast operation;
    in response to identifying a cast operation, determine whether the identified cast operation involves a cast from a pointer to a raw memory data type to a pointer to a structured data type;
    in response to a determination that a raw memory pointer is cast to a pointer to a structured data type, determine whether the structured data type casted to is associated with indicia of externalness;
    in response to a determination that the structured data type casted to is associated with indicia of externalness, designate a value addressed by that pointer as tainted; and
    determine whether a value designated as tainted is indicated in the representation as consumed by an operation in the computer program that acts as a taintedness sink.

2. The method of claim 1 further including:
configuring a computer system to,
determine whether the representation indicates that the computer program sanitizes the value associated with identified cast operation.

3. The method of claim 1 further including:
configuring a computer system to,
determine whether the representation indicates that the computer program sanitizes the value associated with identified cast operation;
in response to determinations that the value associated with identified cast operation is consumed by an operation in the computer program that acts as a taintedness sink and that the computer program does not sanitize the value associated with identified cast operation, report that an unsanitized value is consumed by the sink.

4. The method of claim 1 further including:
configuring a computer system to,
determine whether the representation indicates that the computer program includes operations to sanitize the value associated with identified cast operation through path termination.

5. The method of claim 1 further including:
determine whether the representation indicates that the computer program includes operations to sanitize the value associated with identified cast operation through value substitution.

6. The method of claim 1 further including:
determine whether the representation indicates that the computer program includes operations to sanitize the value associated with identified cast operation through at least one of path termination and variable substitution.

7. The method of claim 1,
wherein the representation includes source code.

8. The method of claim 1,
wherein the representation includes an abstract syntax tree.

9. The method of claim 1,
wherein the representation includes byte code.

10. The method of claim 1,
wherein the transformed representation includes object code that retains sufficient source-level information about types and casting.

11. The method of claim 1,
wherein determining whether a structured data type casted to is associated with indicia of externalness includes determining whether any field has a pointer type.

12. The method of claim 1,
wherein association of a structured data type casted with a field that has a pointer type indicates internalness.

13. The method of claim 1,
wherein determining whether a structured data type casted to is associated with indicia of externalness includes weighing one or more factors from the group including: diversity of field sizes in the casted data type, whether the casted data type has bit fields, whether unsigned fields are present, packing of the data type.

14. The method of claim 13,
wherein a large number of fields, many different data sizes, frequent use of bit fields, and the frequent use of unsigned types are indicative of externalness; and
wherein presence of pointer type fields are indicative of not externalness.

15. The method of claim 1,
wherein identifying a pointer cast operation includes tracing code expressions within the representation.

16. The method of claim 1,
wherein identifying a pointer cast operation includes tracing code expressions within the representation; and wherein determining whether a value designated as tainted is indicted in the representation as consumed by an operation in the computer program that acts as a taintedness sink includes tracing code expressions within the representation.

17. The method of claim 1 further including:

in response to a determination that the value designated as tainted is consumed by an operation that acts as a taintedness sink, report a taintedness result.

18. The method of claim 1, wherein identify within the representation a pointer cast operation includes identifying an explicit cast operation.

19. The method of claim 1, wherein identify within the representation a pointer cast operation includes identifying an implicit cast operation.

20. The method of claim 1 further including:

traversing the computer program in a direction from the representation a pointer cast operation to the operation in the computer program that acts as a taintedness sink.

21. The method of claim 1 further including:

traversing the computer program in a direction from the operation in the computer program that acts as a taintedness sink to the representation of the pointer cast operation.

22. The method of claim 1, wherein association of a structured data type casted with a field that has a pointer type indicates internalness; and wherein determining whether a structured data type casted to is associated with indicia of externalness includes weighing one or more factors from the group including: diversity of field sizes in the casted data type, whether the casted data type has bit fields, whether unsigned fields are present, packing of the data type.

23. An article of manufacture that includes a computer readable device encoded with instruction code to cause a computer to perform a process that includes:

configuring a computer system to, store a representation of a computer program that is to be evaluated in non-transitory storage media;

identify within the representation a pointer cast operation;

in response to identifying a cast operation, determine whether the identified cast operation involves a cast from a pointer to a raw memory data type to a pointer to a structured data type;

in response to a determination that a raw memory pointer is cast to a pointer to a structured data type, determine whether the structured data type casted to is associated with indicia of externalness;

in response to a determination that the structured data type casted to is associated with indicia of externalness, designate a value addressed by that pointer as tainted; and determine whether a value designated as tainted is indicated in the representation as consumed by an operation in the computer program that acts as a taintedness sink.

* * * * *

UNITED STATES PATENT AND TRADEMARK OFFICE
CERTIFICATE OF CORRECTION

PATENT NO. : 9,015,831 B2  
APPLICATION NO. : 13/570024  
DATED : April 21, 2015  
INVENTOR(S) : Scott et al.

Page 1 of 1

It is certified that error appears in the above-identified patent and that said Letters Patent is hereby corrected as shown below:

On page 2, in column 1, item (56), under "Other Publications", line 2, delete "Programing" and insert --Programming--, therefor Signed and Sealed this  
Seventeenth Day of November, 2015

Michelle K. Lee  
*Director of the United States Patent and Trademark Office*